(12) United States Patent
Chow et al.

(10) Patent No.: US 7,646,334 B1
(45) Date of Patent: Jan. 12, 2010

(54) RADAR SIGNAL PROCESSING SYSTEM AND METHOD FOR ANALYZING DOWNHOLE OIL AND GAS WELL ENVIRONMENTS

(76) Inventors: Ivan K. Chow, 4828 Bull Run Dr., Plano, TX (US) 75093; Michael L. Sheriff, 1504 Aylesbury La., Plano, TX (US) 75075

( * ) Notice: Subject to any disclaimer, the term of this patent is extended or adjusted under 35 U.S.C. 154(b) by 0 days.

(21) Appl. No.: 12/208,649

(22) Filed: Sep. 11, 2008

(51) Int. Cl.
*G01S 13/00* (2006.01)
(52) U.S. Cl. .......................... 342/194; 342/22
(58) Field of Classification Search ................ 342/22, 342/194
See application file for complete search history.

(56) References Cited

U.S. PATENT DOCUMENTS 5,146,541 A 9/1992 Speidel
5,969,667 A * 10/1999 Farmer et al. ............... 342/165
6,366,236 B1 4/2002 Farmer et al.

OTHER PUBLICATIONS

S. Fujii et al., "Neural Network Processing of FMCW Doppler Radar", SPIE, 2/94, vol. 2315. pp. 383-389.*
S. Fujii et al., "Neural Network Step Frequency Fault Locator", Optical Engineering, 1995, vol. 34., No. 5, pp. 1441-1449.*
C.M. Bishop, et al.; "GTM: The Generative Topographic Mapping"; Neural Computation; 1998b; 10:215-234; Microsoft Research; Cambridge, U.K.

* cited by examiner

*Primary Examiner*—Ian J Lobo
(74) *Attorney, Agent, or Firm*—Klemchuk Kubasta LLP

(57) ABSTRACT

A radar signal processing system utilizing a specialized neural network generative topographic mapping method which employs an alternative method for characterizing multiple radar signatures wherein specialized phased-codes and wavelet waveform modulations are used. The invention comprises three layers each including a plurality of nodes: input layer, mapping layer, and output presentation layer. The input layer takes the collected signals and congregates them into groups of linear data points. The mapping layer provides a method for projecting the data into points of lower dimensions. The data is assumed to arise by first probabilistically picking a point in a low-dimensional space, mapping the point to be observed in high-dimensional input space, then adding noise. The result is a system in which radar data with multiple reflections in close proximity is manipulated into multiple signatures in systematic ways for use in downhole structure signatures.

1 Claim, 8 Drawing Sheets

RADAR SIGNAL PROCESSING SYSTEM AND METHOD FOR ANALYZING DOWNHOLE OIL AND GAS WELL ENVIRONMENTS

DETAILED DESCRIPTION

Figure 1:
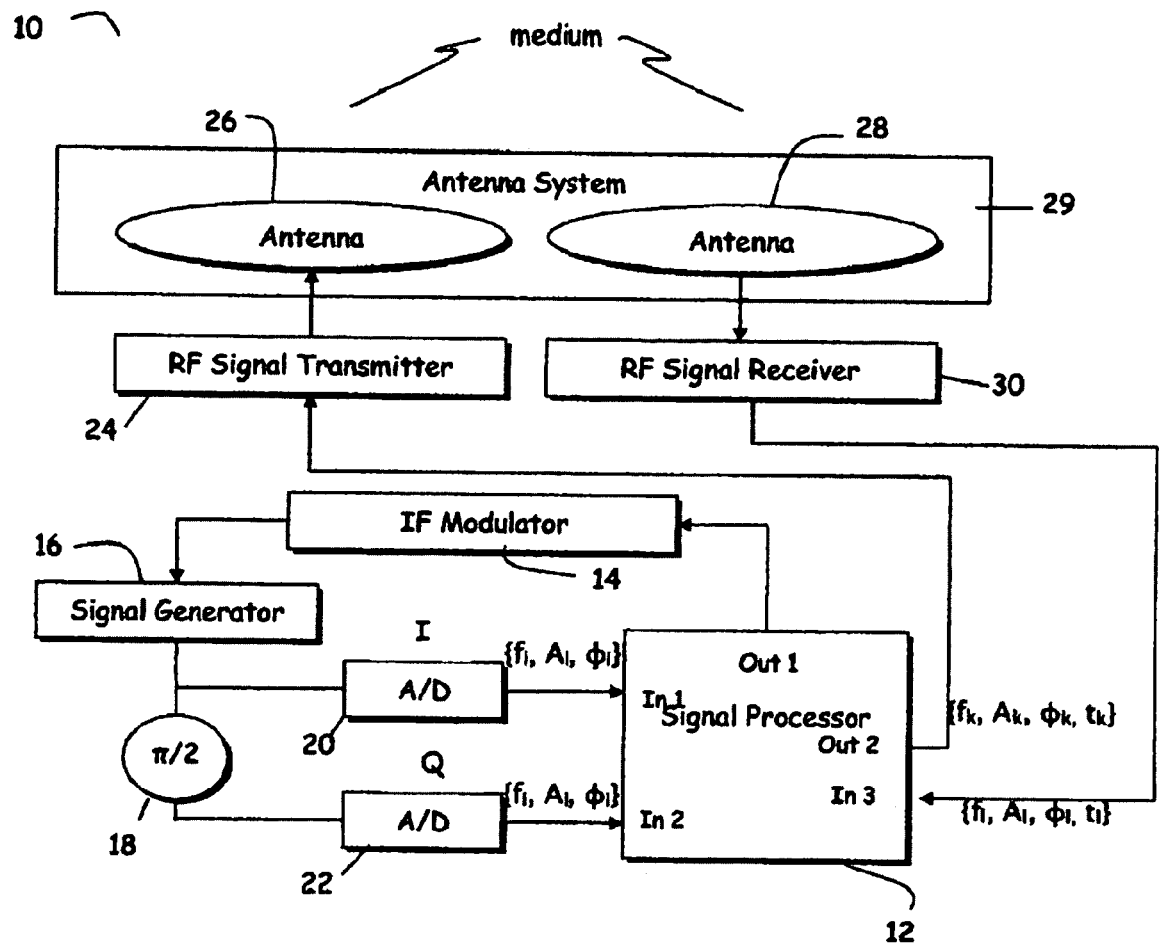
FIG. 1 is a block diagram of a neural network radar signal processing system using the intermediate frequency modulation comprising an embodiment of the invention.

FIG. 1 illustrates an embodiment of the invention comprising a stepped frequency modulated continuous wave (FMCW) radar system 10. A central component of the embodiment of FIG. 1 is the signal processor 12, which constructs an intermediate frequency (IF). The IF frequency range is generally within the audio frequency range, that is, 2 kHz to 20 kHz. The IF modulator 14 applies modulated waveforms or functions to the IF frequency and passes the signal to a signal generator 16. Amplitude and phase outputs of the signal generator 16 are coupled directly to a first analog-to-digital (A/D) converter 20, and through a π/2 (90°) phase shift component 18 to a second analog-to-digital (A/D) converter 22. The A/D converters 20 and 22 generate digital RF phased signals called in-phase (I) and quadrature (Q) signals, respectively. Specialized phased-code functions or wavelet waveforms can be generated within IF by combining signal generation and modulation processes programmed in the signal processor. The desired I & Q digital signals are then utilized by the signal processor 12 to send signal data to a RF signal transmitter 24. An antenna configuration 29 consists of a transmitting antenna 26, which is coupled to the output of the RF signal transmitter 24 for transmitting RF signals through a medium, such as a downhole fracture or similar structure, and a receiving antenna 28 which is connected to a RF signal receiver 30 for collecting reflected RF signals. The reflected RF signal results from the RF signal receiver 30 are then sent back to the signal processor 12 for further analysis. Within the antenna configuration 29, there can be multiple transmitting antennas 26 and multiple receiving antennas 28, or the transmitting and receiving antennas can comprise combined antennas. Furthermore, the RF signal transmitter 24 and RF signal receiver 30 are designed so that together with the impedance of the antenna configuration 29, the system is matched to the desired transmitted and received frequency. Finally, the digital signal generator 16, operating in a given spatial orientation relative to the of transmitting antenna 26 and receiving antenna 28 can collect quadruple information of $\{f_k, A_k, \phi_k, t_k\}$, where $f_k$ is the frequency, $A_k$ is the amplitude, $\phi_k$ is the phase information, and $t_k$ is the time of the signal at spatial orientation k.

Figure 2:
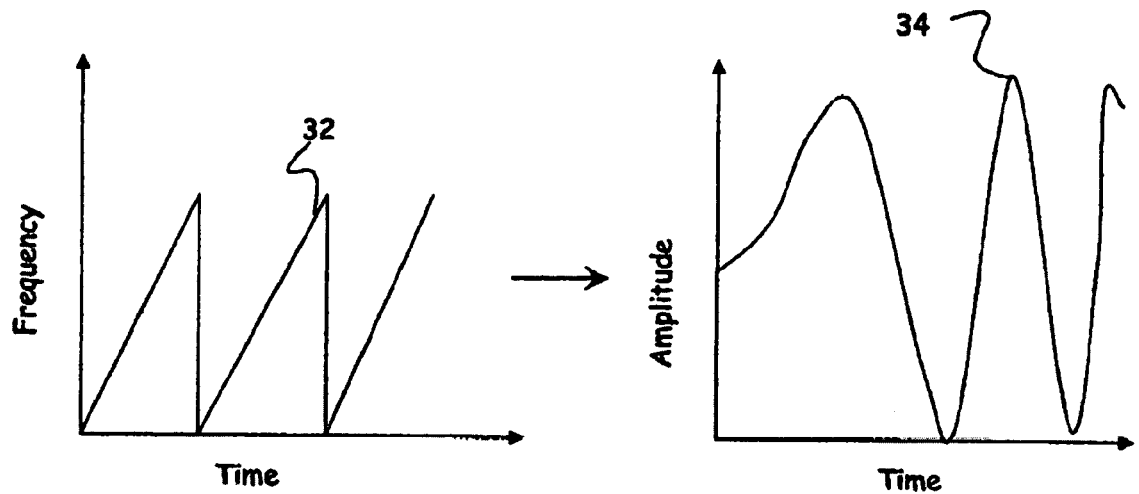
FIG. 2 illustrates typical waveforms for the continuous frequency modulation continuous wave radar signal used in a signal processing method comprising an embodiment of the invention.

FIG. 2 shows an embodiment of the invention comprising a linear FMCW radar signal 32 that is repetitively and linearly swept through a predefined range of frequencies. The radar signal transmitted from the transmission antenna 26, within the antenna configuration 29, illuminates and is backscattered by a target (not shown). The backscattered signal 34 is then received by receiving antenna 28, also within the antenna configuration 29, after undergoing a delay corresponding to the round trip distance between the radar system 10 and the target. The received backscattered signal is then mixed with the transmitted signal, or a copy thereof, to generate a modulated IF radar signal, wherein the frequency of the modulated IF radar signal is proportional to the range to the target.

Figure 3:
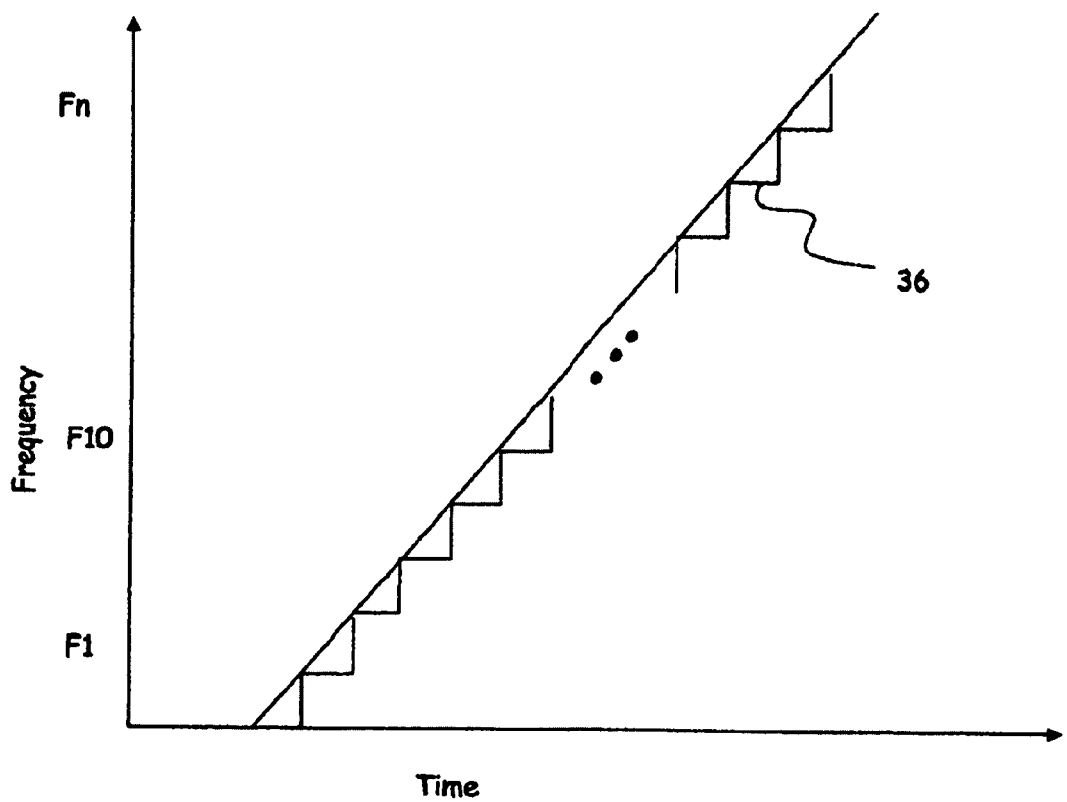
FIG. 3 illustrates a typical stepped frequency modulation continuous wave radar waveform in frequency vs. time space, as utilized in a signal processing method comprising an embodiment of the invention.

FIG. 3 illustrates an example of the frequency variation of a typical signal comprising an embodiment of the invention. A direct digital synthesizer is used to approximate a FMCW radar signal 36 by using a stepped frequency modulation signal. Alternatively, a general digital synthesizer can be used. For example, the signal processor 12 of FIG. 1 can be used to step the frequency of the direct digital synthesizer, which then generates a signal in accordance with that described in FIG. 3.

Figure 4:
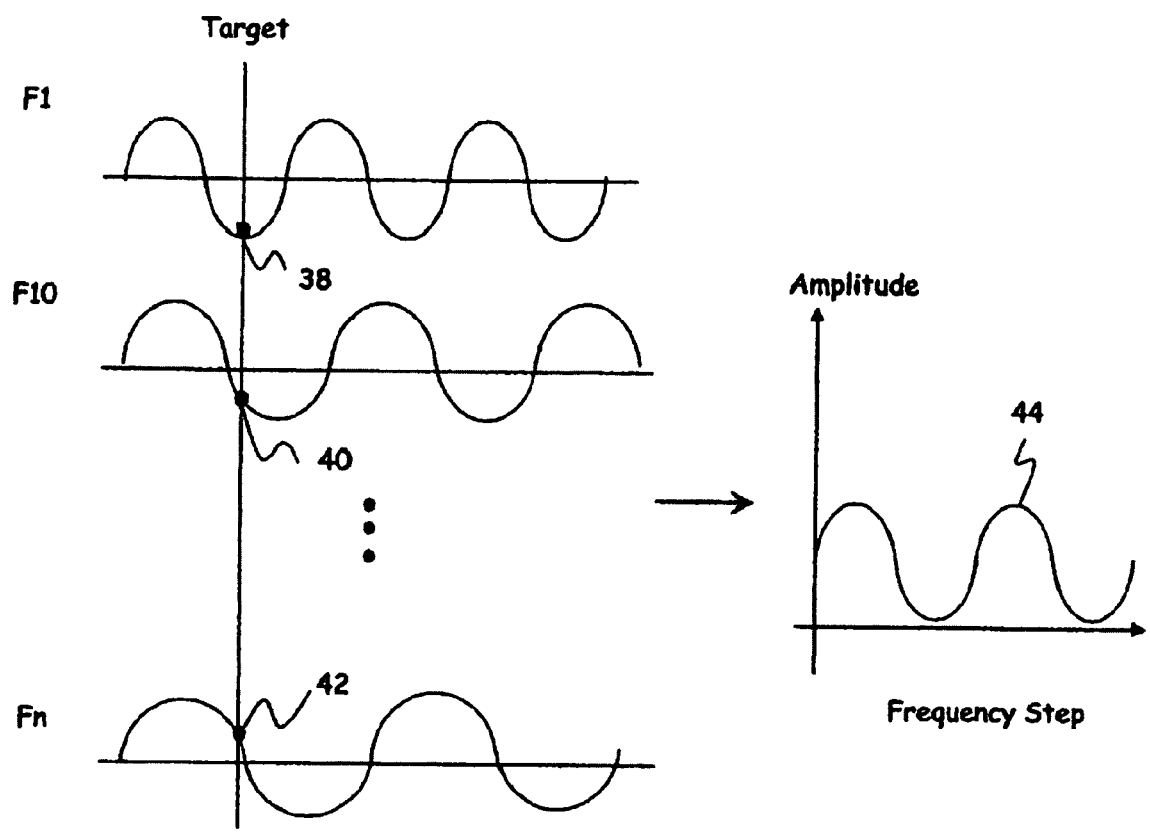
FIG. 4 illustrates typical stepped frequency modulation continuous wave radar signals in amplitude vs. time space for several frequency steps, as utilized in a signal processing method comprising an embodiment of the invention.

FIG. 4 illustrates how for a given target at a given range, the instantaneous amplitude of the return signal from each frequency step 38, 40, 42 is different because the range to the target corresponds to a different phases for each frequency step, thereby resulting in a different value from the associated sine wave. Therefore, for a target at a specific range, the FMCW radar target detection system provides a sinusoidal IF modulated signal 44 having a frequency that corresponds to the range to the target. Accordingly, the neural network processor operates to detect discrete frequency signals, such as a highly correlated sinusoidal signal corresponding to a target, in a noisy background that is random and weakly correlated.

Figure 5:
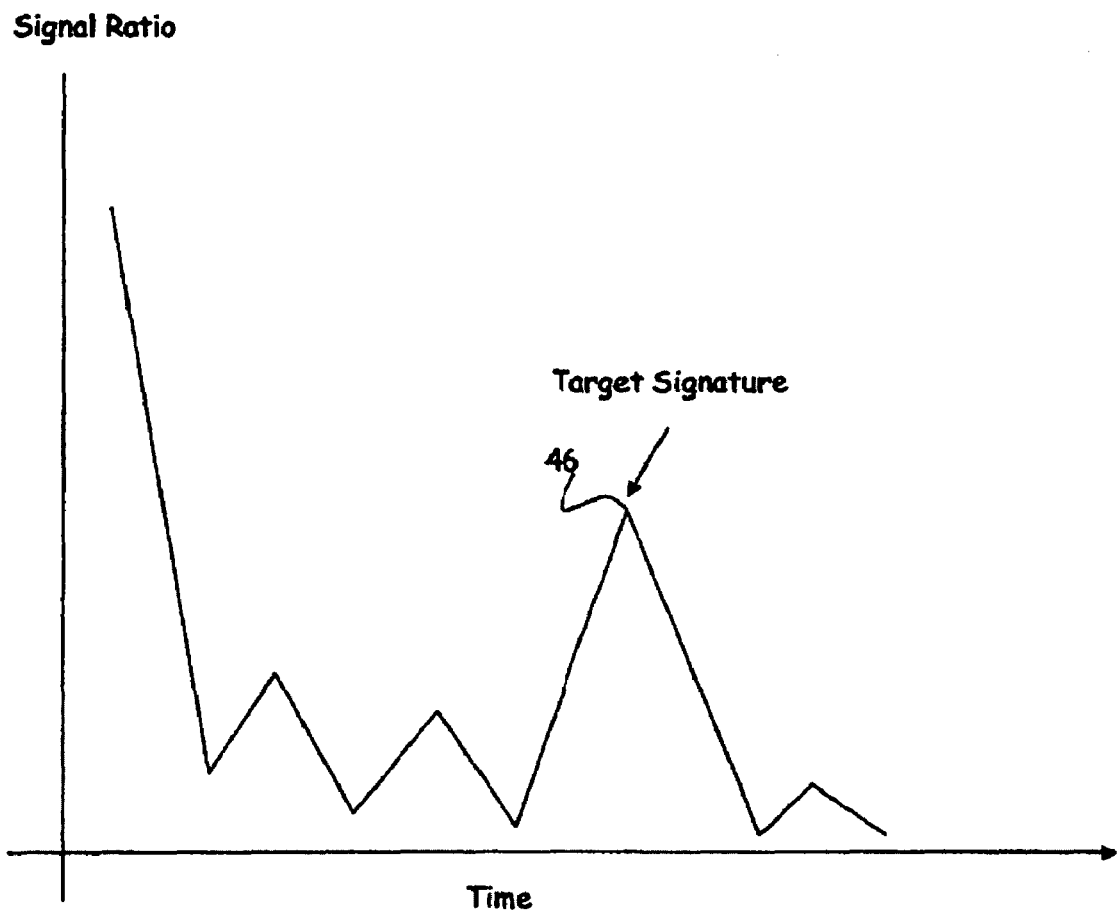
FIG. 5 illustrates a single waveform signature captured in time domain using a particular frequency modulation continuous wave configuration and intermediate frequency modulation method comprising an embodiment of the invention.

FIG. 5 shows a typical single signature 46 collected through a typical FMCW radar system. The signatures collected through typical FMCW radar systems are often very complex, in accordance with embodiments of the invention. However, a neural network system can be applied to systematically "train" the detection system to recognize typical patterns. Although there exist neural network radar systems that use different methods of analyzing the signals, embodiments of the invention utilize a specialized linearly generative topographic method (LLGTM) for mapping the data.

Figure 6:
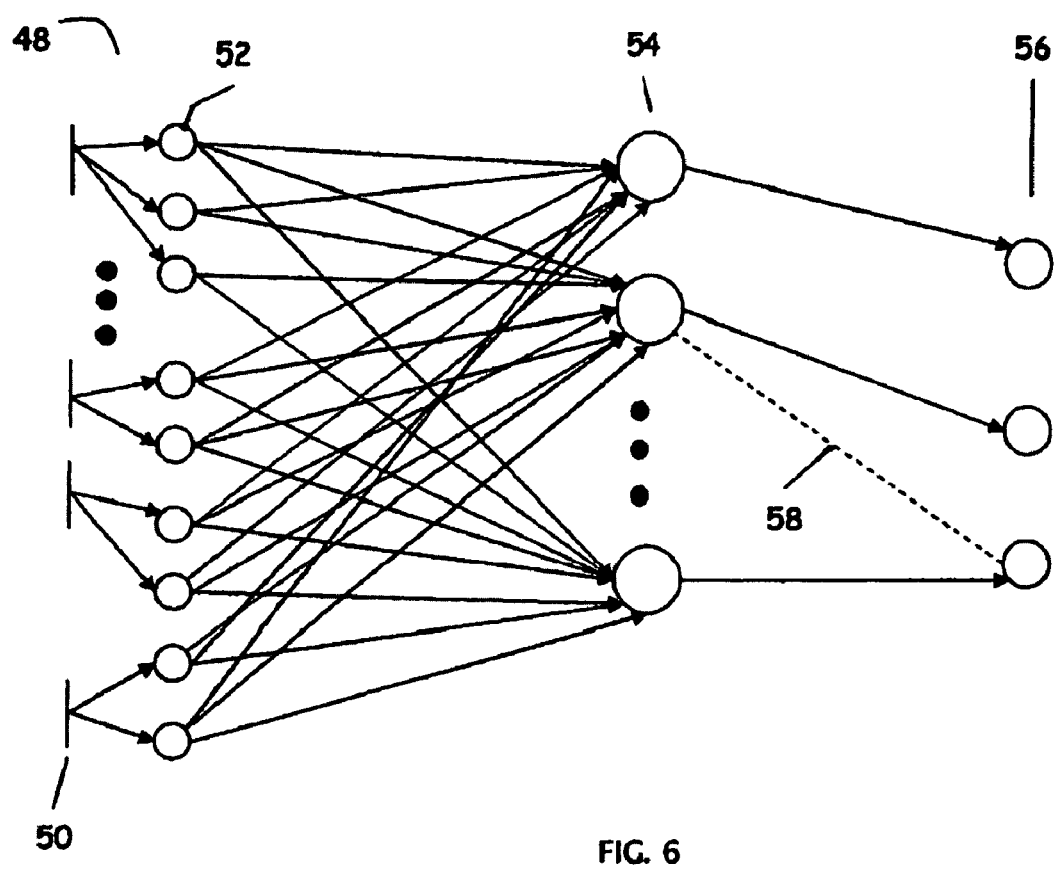
FIG. 6 is diagrammatic representation of a neural network system having three layers of plurality of nodes; i.e., input layer, mapping layer, and output layer comprising an embodiment of the invention.

FIG. 6 shows a typical neural network 48 system comprising three layers of processing; a first input layer 52, a second mapping layer 54, and a third output layer 56. The first input layer 52 maps collected signals 50 to the second mapping layer 54, which consists of data matrices. The system then applies a transformation 58 of the data in the data matrixes into a projection or output layer (latent data space) 56 using algorithms that best fit the observed environment.

Figure 7:
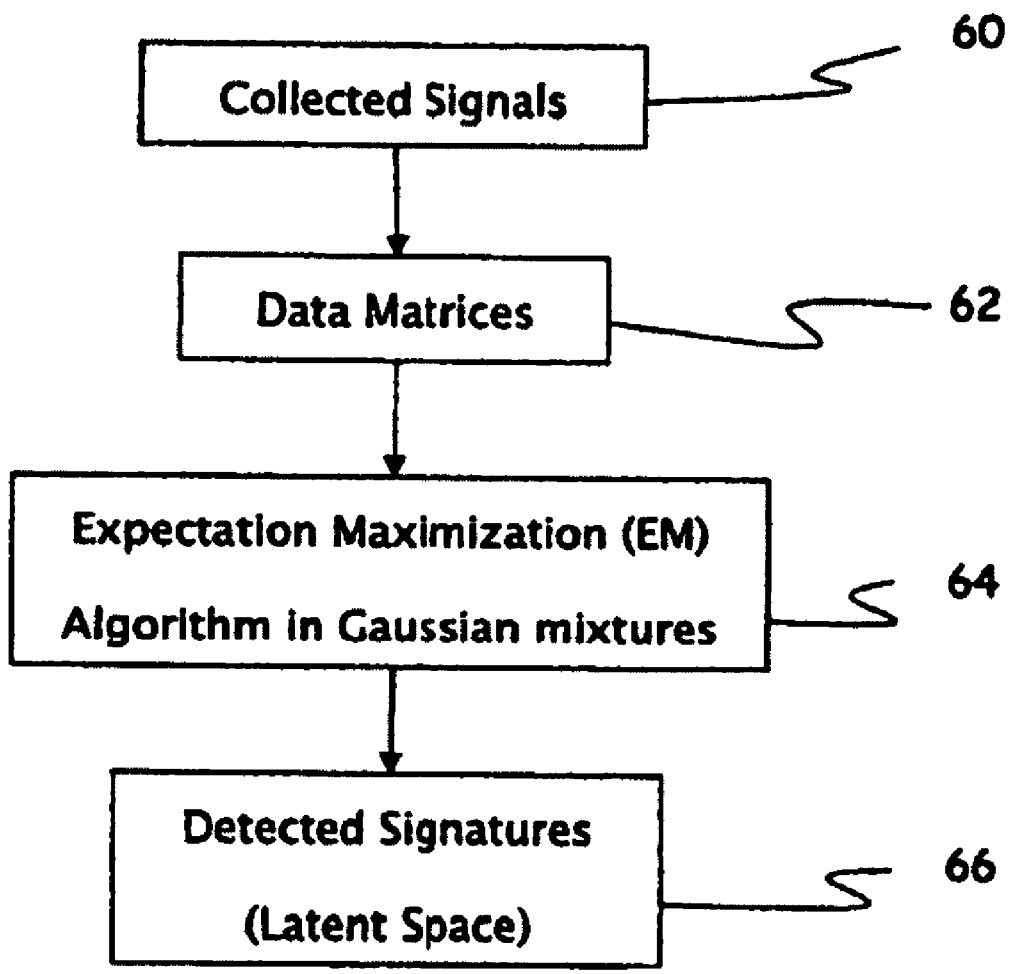
FIG. 7 is a block diagram of a generative topographic method as applied to a collected signal in accordance with an embodiment of the invention.

FIG. 7 is a flow diagram showing a process for handing data comprising an embodiment of the invention. First, an algorithm is applied to the collected signals 60 in the various data matrixes 62. The collected signals 60 include not only the quadruples $\{f_k, A_k, \phi_k, t_k\}$, but also spatial information of the antenna $\{x_m, \dot{x}_m, \alpha_m, \dot{\alpha}_m\}$, comprising part of the input where $x_m$ is the orientation, $\dot{x}_m$ is the linear speed, $\alpha_m$ is the angular orientation, and $\dot{\alpha}_m$ is the angular speed of the antenna, at a given collection instant m. Embodiments of the invention may be utilized to find representations for the distribution of position of signatures p(t) in D-dimensional space $t=(t_1, \ldots t_D)$ in terms of a number L of latent variables $v=(v_1, \ldots v_L)$, where L<D. Both L and D have 4-fold dimensions which can be partitioned in terms of the spatial information but the topographically mapping of each partition yields comparative results.

Figure 8:
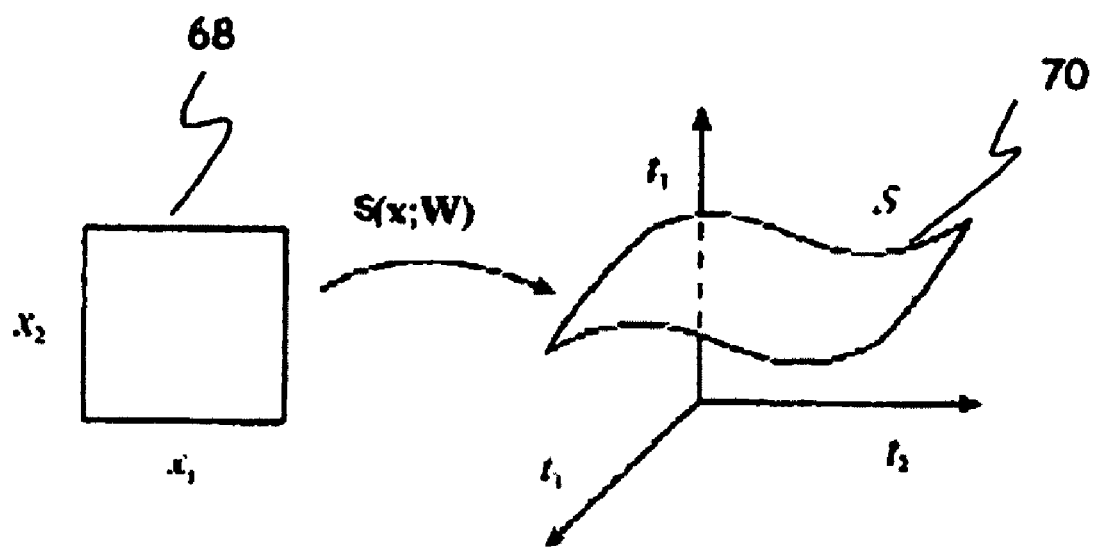
FIG. 8 is an illustration of a typical generative topographic mapping function in accordance with an embodiment of the invention.

FIG. 8 illustrates a mapping function s(x; W) that maps points x in latent space into corresponding points s(x; W) in data space. This illustrates schematically the case of L=2 and D=3 using the mapping function topographically.

Figure 9:
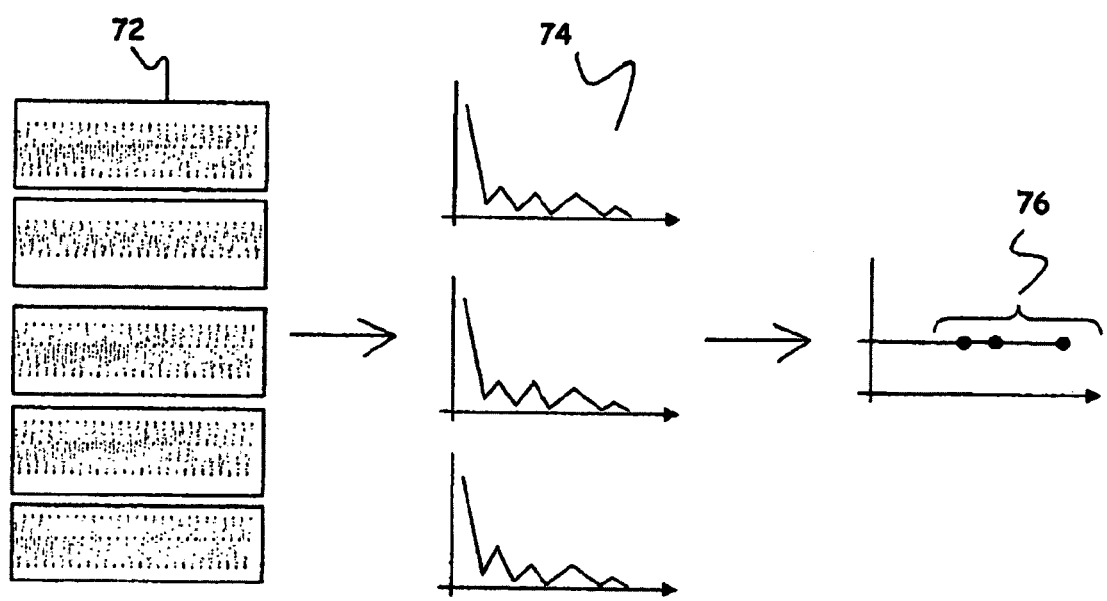
FIG. 9 is a graph of a synthetic target reflection signature method resulting from the application of generative topographic mapping in accordance with an embodiment of the invention.

Finally, FIG. 9 illustrates how raw signals 72 are captured and sorted into data matrices 74 in accordance with the embodiments of the invention. After the data matrices 74 are formed another algorithm is applied to the data matrices based on the expectation maximization in Gaussian distribution, it being assumed that all random signals/noises are in Gaussian distribution. Since reflected signals are not noise, when extracted using this algorithm, the projected output of the reflected signals is unique. Finally, the "detected" signals in this output space are further congregated into data groups 76 represented respectively by the modeling and data presentation systems.

In the linear model of the invention the distribution on x in latent space for s signatures in data space, choosing k points in uniformly randomly distribution, $D(\mu, \Sigma)$ to donate a Gaussian distribution with mean $\mu$ and covariance matrix $\Sigma$, the distributions are:

$$p(s) = \frac{1}{k}$$

$$p(g|s) = D(\kappa_{s'} \rho \sigma^2)$$

$$p(x, g|s) = D(W_\phi(\kappa_s) + \Lambda_s(g - \kappa_s)/\alpha, \sigma^2 I)$$

with observations x drawn from p(x|g, s) where p(g, s) is the mapping latent coordinate. The distribution on x given s reads:

$$p(x|s) = D(W_\phi(\kappa_s), \sigma^2(I + \rho \Lambda_s \Lambda_s^T))$$

Each mixture component p(x|s) is a Gaussian with variance $\sigma^2$ in all directions except those directions given by the columns $\Lambda_s$ where the variance is $\rho$ times larger. The distribution on latent coordinates is a mixture of isotropic Gaussians (spherical covariance matrix) with equal mixing weights. The columns of the matrix $\Lambda_s$ span the subspace of mixture components s, and provide the mapping for component s between the latent space and the data space. The parameter $\alpha$ is an adjustable factor between latent and data space. The factor is defined prior to applying the model to the distribution.

One principle method used in embodiments of the invention is Principal Component Analysis (PCA). Assuming the data has zero mean, the data vectors $\{x_n\}$ are modeled as $x_n = \Lambda g_n + \epsilon_n$, where $x_n$ is a D-dimensional data vector, $g_n$ the corresponding latent coordinate, $\Lambda$, a D×d dimensional matrix and a $\epsilon_n$ residual vector. PCA uses the linear mapping $\Lambda$ that minimizes sum of the squared norms of the residual vectors to map the data into d dimensional representation. In linearly mapping, the covariance matrix is constrained to be of the form:

$$\sigma^g(1 + \rho \Lambda_s \Lambda_s^P)$$

While embodiments of neural network radar signal processing systems for analyzing downhole oil and gas well environments have been described herein it will be apparent that modifications and variations thereto are possible, all of which fall within the spirit and scope of embodiments of the invention. With respect to the foregoing descriptions of embodiments of the invention those skilled in the art will understand that the optimum relationships comprising embodiments of the invention include variations in form, function and manner of operation, assembly and use, are deemed readily apparent and obvious to those skilled in the art, and all equivalent relationships to those illustrated in the drawings and described in the specification are intended to be encompassed by embodiments of the invention. For example, various logic circuits, processors, micro-controllers, and other circuitry can be used to implement the algorithms and functions of comprising embodiments of the invention.

Although the invention has been described with reference to illustrative embodiments, the foregoing description is not intended to limit the scope of the invention. Various modifications and combinations of the illustrative embodiments as well as other embodiments of the invention will be apparent to persons skilled in the art upon reference to the description. It is therefore intended that the appended claims incorporate any such modifications or embodiments.

The invention claimed is:

1. A radar signal processing system, comprising:
   a digital signal processor comprising first, second, and third inputs and first and second outputs;
   an IF modulator for generating IF signals from a first output signal of said digital signal processor;
   a signal generator for providing analog amplitude and phase signals from an output signal of said IF modulator;
   a first A/D converter for generating in-phase digital signals from said phase signals of said signal generator;
   said in-phase digital signals being supplied to a first input of said digital signal processor;
   a π/2 (90°) phase shift component for providing a 90° phase shift quadrature analog signal from said phase signals of said signal generator;
   a second A/D converter for generating quadrature phase digital signals from an output of said a π/2 (90°) phase shift component;
   said quadrature phase digital signals being supplied to a second input of said digital signal processor;
   a RF signal transmitter;
   an input of said RF signal transmitter being supplied with a signal from a second output of said digital signal processor;
   an antenna configuration for transmitting and receiving RF signals through a medium of interest;
   said antenna configuration further comprising:
     at least one transmitting antenna; and
     at least one receiving antenna; and
   a RF signal receiver for collecting reflected radar signals;
   an input of said RF signal receiver being coupled to said receiving antenna; and
   an output of said RF signal receiver being coupled to a third input of said digital signal processor.

* * * * *